United States Patent [19]
Meshberg

[11] 3,756,465
[45] Sept. 4, 1973

[54] AUTOMATIC PERIODIC DISPENSER

[76] Inventor: Philip Meshberg, 15 Stoneleigh Rd., Fairfield, Conn. 06430

[22] Filed: Jan. 6, 1971

[21] Appl. No.: 104,212

[52] U.S. Cl. .............................. 222/61, 222/402.2
[51] Int. Cl. ............................................. B67d 5/12
[58] Field of Search .................... 222/499, 496, 476, 222/477, 497, 61, 402.13, 402.2, 207; 137/624.14; 239/392, 394

[56] References Cited
UNITED STATES PATENTS

| | | | |
|---|---|---|---|
| 3,150,800 | 9/1964 | Weber | 222/477 X |
| 3,477,613 | 11/1969 | Mangel | 222/499 X |
| 3,094,283 | 6/1963 | Balister | 239/394 X |
| 3,053,461 | 9/1962 | Inglis | 137/624.14 X |
| 3,305,134 | 2/1967 | Carmichael et al. | 137/624.14 X |
| 3,497,108 | 2/1970 | Mason | 137/624.14 X |
| 3,596,835 | 8/1971 | Smith et al. | 239/394 |

Primary Examiner—Samuel F. Coleman
Assistant Examiner—Norman L. Stack, Jr.
Attorney—Johnson & Kline

[57] ABSTRACT

A device for automatically periodically dispensing predetermined quantities of aerosol material under pressure from a container therefor without the use of a clockwork or external cam operator by means of a valve stem operating diaphragm for controlling the valve stem of a metering valve.

2 Claims, 3 Drawing Figures

INVENTOR.
Philip Meshberg
BY
Johnson and Kline
ATTORNEYS

3,756,465

AUTOMATIC PERIODIC DISPENSER

Heretofore in automatic periodic dispensers of aerosols it has been the practice of having a clockwork mechanism or external power-operated cam means to periodically dispense material. This was a cumbersome operation. An effort to overcome this by a self-contained unit is made by U. S. Pat. No. 3,477,613 but this utilized a needle valve to control the aerosol leaving the container and a spring diaphragm operated valve to control the dispensing operation. With this it was difficult to accurately control the quantity of aerosol dispensed with each operation.

The present invention overcomes these difficulties by providing a self-contained unit which includes a stem-operated metering valve to dispense a predetermined quantity of aerosol material for each actuation of the valve stem and has a pressure-operated diaphragm for periodically actuating the stem. This provides a compact unit which is easy to handle and operate and is accurate in the quantity dispensed.

Other features and advantages of the invention will be apparent from the specification and claims when considered in connection with the accompanying drawings in which:

Figure 1:
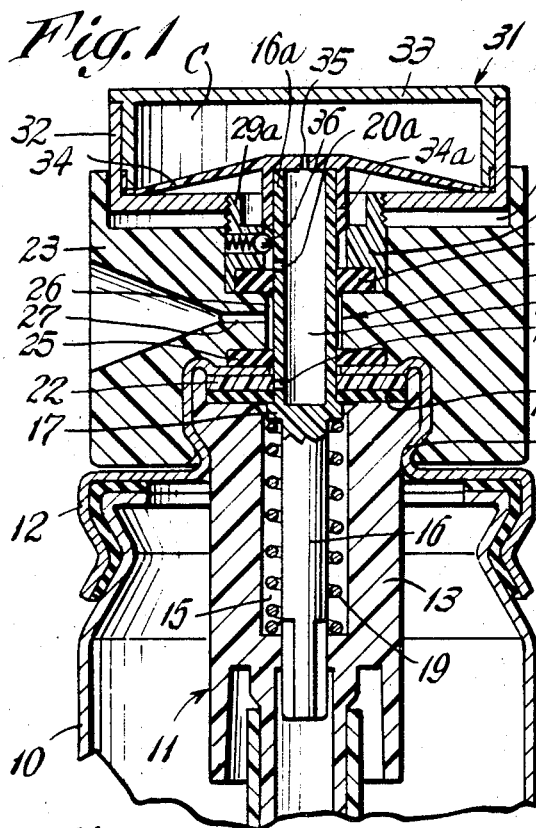
FIG. 1 shows a longitudinal sectional view showing the device in its normal inoperative position.

As shown in the drawings, a container 10 containing an aerosol under pressure has a metering valve 11 mounted thereon by a mounting flange 12 interlocked with the container. The flange 12 is secured to the valve housing 13 of the metering valve by being crimped as at 14 to the head thereof. The valve housing of the metering valve has a metering chamber 15 therein and the usual reciprocating valve stem 16 having a shoulder 17 pressed against a washer 18 closing and sealing the measuring chamber, with the portion 16a of the stem projecting outwardly beyond the mounting means. The shoulder on the stem is normally urged into sealing relation with the undersurface of the washer by a spring 19 and has a discharge orifice 20 communicating with a longitudinal passage 21 in the projecting end 16a of the stem. If desired a plastic washer 22 can be disposed behind the washer 18 to support the same.

A dispensing housing 23, which is preferably made of plastic material, has a bore 24 therein which receives the projecting end 16a of the valve stem when the bottom of the housing is snapped into interlocked position, as shown in FIG. 1, with the crimped portion of the mounting means of the valve. A sealing washer 25 engages the stem and bears against the outside of the mounting means and against the bottom of the dispensing housing to seal an enlarged bore 26 surrounding the stem and communicating with an outlet orifice 27 or nozzle for the aerosol material. The dispensing housing has a sealing washer 28 closing the enlarged bore 26 and engaging the stem 16a. The stem 16 has a dispensing port 20a communicating with the passage 21 and normally located, as shown in FIG. 1, to be sealed from the outlet orifice by sealing washer 28. A bushing 29 is mounted at the upper end of the bore 24 holding the sealing washer 28 in place and communicating with a recess 30 in the end of the dispensing housing. A control unit 31 is threaded on the end 29a of the bushing 29 as shown in FIG. 1 and disposed in the recess 30. The control unit comprises a cup-shaped base 32 having a cover element 33 secured thereto to form a pressure chamber C. Extending across the base is a resilient diaphragm 34 having its edges clamped to the base by the cover 33 and having a central depending sleeve 34a which engages and embraces the end of the valve stem 16a and is held in the normal position of FIG. 1 by the spring 19 acting on the stem 16.

The diaphragm has a small aperture 35 communicating with the longitudinal passages in the end of the stem to receive gas under pressure therefrom as will be explained. Means are provided for preventing operation of the diaphragm to act on the valve stem until the pressure in the pressure chamber exceeds the force necessary to overcome the spring 19 and move the stem inwardly. In the illustrated form of the invention this means comprises a spring-pressed ball detent 36 engaging the end of the sleeve 34a and resisting inward movement until a predetermined pressure builds up in pressure chamber C. With this arrangement the spring forces the stem to its uppermost position as shown in FIG. 1, and closes off the chamber at the shoulder 17 on the valve stem.

Figure 2:
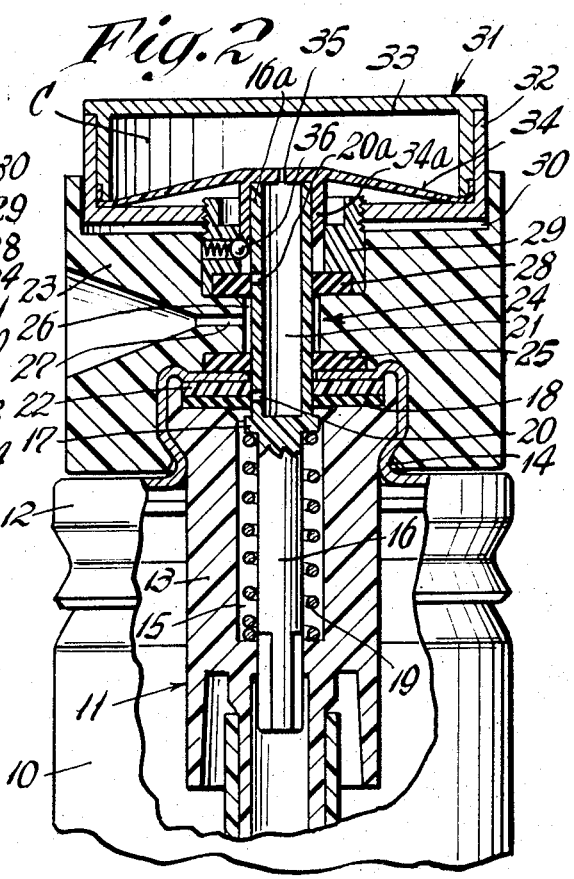
FIG. 2 is a view similar to FIG. 1 of the control device with the control being moved into operative relation.
Figure 3:
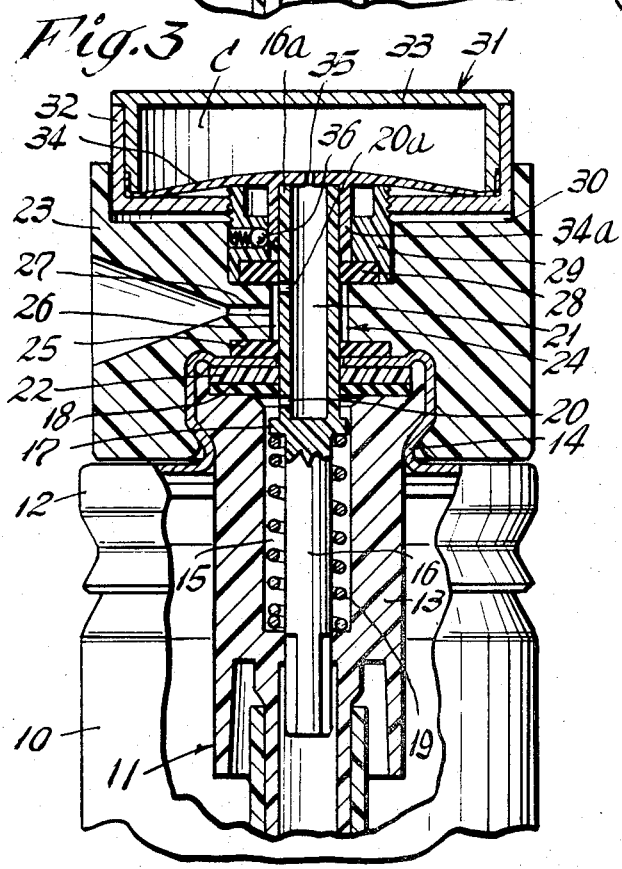
FIG. 3 is a view similar to FIG. 2 showing the action during the dispensing operation.

When it is desired to operate the valve stem in an automatic periodic manner, the control unit is threaded inwardly on the bushing to the position as shown in FIG. 2. This causes the shoulder 17 to be moved out of sealing relation with the washer 18 and permits gas under pressure from the container to seep along the stem into the orifice 20 and passage 21 of the stem. The gas will pass along the passage to the small aperture 35 in the diaphragm and build up pressure in the control chamber C. When the pressure in the control chamber is sufficient to overcome the spring detent 36, the diaphragm 34 will move down and move the valve stem 16 inwardly and cause the discharge orifice 20 to move into the metering chamber and the dispensing port to move to the position shown in FIG. 3 wherein it is in communication with the outlet orifice 27, whereupon the material in the metering chamber is discharged through the orifice 20 and through the discharge passage and the central passage in the stem and through the dispensing aperture in the stem and through the dispensing nozzle. This will empty the measuring chamber and also cause the gas in the control chamber to be dispensed whereupon the spring 19 will move the stem and diaphragm back to the position in FIG. 2 and the operation of filling the metering chamber and the pressure chamber and the depressing of the valve stem repeats periodically until all of the aerosol material in the container is discharged or the control unit is manually turned back to the position of FIG. 1.

Variations and modifications may be made within the scope of the claims and portions of the improvements may be used without others.

I claim:

1. An automatic aerosol dispensing device for use with a pressurized container having material therein to be dispensed, said container having a metered valve provided with a projecting reciprocating valve stem having a discharge orifice for receiving material from the container into the valve stem and a dispensing orifice for dispensing material from the valve stem into the atmosphere, resilient means for urging said stem into projection position in which said discharge orifice and said dispensing orifice are closed, and sealing means for preventing the seepage of material from said container through said discharge orifice into said stem when the stem is in projected position, said device comprising a control unit having a pressure chamber and a diaphragm mounted within said chamber and connected to said valve stem to move between a non-dispensing position, in which said stem is in fully projected position, and a dispensing position, in which said stem is in fully depressed position and said discharge orifice is open to the container and said dispensing orifice is open to the atmosphere, in response to pressure in said pressure chamber, means for positioning said diaphragm at an intermediate activating position in which the diaphragm depresses the valve stem against the resilient means sufficiently to free said sealing means and permit the seepage of material from said container through said discharge orifice into said stem, said diaphragm having an orifice communicating with the stem to receive and transmit gas under pressure from said container through said stem to said pressure chamber, detent means for holding said stem in non-dispensing position until a predetermined pressure is built up in said pressure chamber, due to the seepage of said material from said container through said discharge orifice into said stem and into said pressure chamber, and thereafter releasing said stem to depress the stem to said dispensing position to open said discharge orifice to the container and to open said dispensing orifice to the atmosphere and discharge a predetermined quantity of said material from the container while simultaneously discharging the gas in the chamber of the control unit, whereupon the resilient means returns the stem and connected diaphragm to the activating position for repeated dispensing operation.

2. The invention as defined in claim 1 wherein the detent means comprises a spring-pressed ball.

* * * * *